(12) United States Patent
Kim et al.

(10) Patent No.: US 9,134,132 B2
(45) Date of Patent: Sep. 15, 2015

(54) VEHICLE NAVIGATION AND METHOD FOR INDUCING NORMAL BLACK BOX POSITION IN NAVIGATION SYSTEM

(75) Inventors: Heungwon Kim, Seoul (KR); Seungwan Woo, Seoul (KR); Wonkeun Lee, Gwangmyung-si (KR); Haeil Lee, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 228 days.

(21) Appl. No.: 13/519,665

(22) PCT Filed: Jan. 13, 2011

(86) PCT No.: PCT/KR2011/000247
§ 371 (c)(1),
(2), (4) Date: Aug. 20, 2012

(87) PCT Pub. No.: WO2011/093604
PCT Pub. Date: Aug. 4, 2011

(65) Prior Publication Data
US 2012/0323449 A1    Dec. 20, 2012

(30) Foreign Application Priority Data
Jan. 28, 2010  (KR) .................. 10-2010-0007985

(51) Int. Cl.
| G06F 17/00 | (2006.01) |
| G01M 17/00 | (2006.01) |
| G01C 21/26 | (2006.01) |
| B62D 41/00 | (2006.01) |
| G07C 5/08 | (2006.01) |

(52) U.S. Cl.
CPC ............. *G01C 21/26* (2013.01); *B62D 41/00* (2013.01); *G07C 5/085* (2013.01)

(58) Field of Classification Search
CPC ............................. G06F 17/00; G01M 17/00
USPC ..................................................... 701/49, 523
See application file for complete search history.

(56) References Cited

U.S. PATENT DOCUMENTS

| 6,285,393 | B1 * | 9/2001 | Shimoura et al. | 348/119 |
| 6,594,600 | B1 * | 7/2003 | Arnoul et al. | 702/94 |
| 6,949,904 | B2 * | 9/2005 | Rumney | 318/565 |
| 7,758,121 | B2 * | 7/2010 | Browne et al. | 297/284.11 |

(Continued)

FOREIGN PATENT DOCUMENTS

| JP | 2006-287789 | 10/2006 |
| JP | 2007-266930 | 10/2007 |

(Continued)

*Primary Examiner* — Calvin Cheung
*Assistant Examiner* — Martin Weeks
(74) *Attorney, Agent, or Firm* — Fox Rothschild LLP

(57) ABSTRACT

A vehicle navigation of the present invention comprises: a storage unit which stores normal posture data of a vehicle black box; a communication unit which communicates with the vehicle black box; and a controller which obtains current posture data by analyzing data received from the vehicle black box, and determines whether the stored normal posture data is matched with the obtained current posture data. According to the present invention, the driver is notified in advance that the position of a camera is out of shape due to the repeated vibration or acceleration or the like of a vehicle. Thus, the driver can correct the vehicle black box, the camera equipped in the vehicle black box or the camera provided in the vehicle to the normal positions.

17 Claims, 18 Drawing Sheets

(56) References Cited

U.S. PATENT DOCUMENTS

| | | | |
|---|---|---|---|
| 8,682,537 B2* | 3/2014 | Kang et al. | 701/49 |
| 8,977,408 B1* | 3/2015 | Cazanas et al. | 701/2 |
| 2004/0167709 A1* | 8/2004 | Smitherman et al. | 701/208 |
| 2005/0017842 A1* | 1/2005 | Dematteo | 340/5.72 |
| 2008/0181591 A1* | 7/2008 | Hongo | 396/50 |
| 2008/0195315 A1* | 8/2008 | Hu et al. | 701/212 |
| 2008/0280625 A1* | 11/2008 | Larsen | 455/456.1 |
| 2010/0045817 A1* | 2/2010 | Saijo | 348/222.1 |
| 2010/0070173 A1* | 3/2010 | Sakamoto | 701/209 |
| 2011/0281562 A1* | 11/2011 | Videtich | 455/414.1 |
| 2012/0086249 A1* | 4/2012 | Hotary et al. | 297/284.3 |

FOREIGN PATENT DOCUMENTS

| | | |
|---|---|---|
| JP | 2009-267602 | 11/2009 |
| KR | 10-2008-0056697 | 6/2008 |
| KR | 10-0892167 | 4/2009 |

\* cited by examiner

VEHICLE NAVIGATION AND METHOD FOR INDUCING NORMAL BLACK BOX POSITION IN NAVIGATION SYSTEM

CROSS REFERENCE TO RELATED APPLICATIONS

This application is the U.S. national phase application of international application no. PCT/KR2011/000247, filed Jan. 13, 2011, which claims priority to Korean application no. 10-2010-0007985, filed Jan. 28, 2010. The contents of both applications are incorporated herein by reference.

TECHNICAL FIELD

The present invention relates to a navigation system, and more particularly, to a vehicle navigation apparatus and a vehicle black box.

BACKGROUND ART

With the popularization of Internet and modification of location information related laws, location based service (LBS) related industries are activated. As one of location based services, a vehicle navigation service that measures a current location of a vehicle or guides a route to a destination is also rapidly activated.

In order to determine a negligence ratio in an accident occurring when a vehicle stops or runs, objective data is needed in many cases. Accordingly, a vehicle black box capable of providing the objective data is used. However, a conventional vehicle black box provides only simple and superficial information about a vehicle state and cannot effectively meet the demands of users.

DETAILED DESCRIPTION OF THE INVENTION

Technical Problems

An object of the present invention is to provide a method of inducing a vehicle black box of a vehicle navigation apparatus and a navigation system to a normal position that position a vehicle black box or a camera that can be connected to and used for a vehicle navigation apparatus at a normal posture through wired communication or wireless communication.

Technical Solutions

According to an aspect of the present invention, a vehicle navigation apparatus includes: a storage unit for storing normal posture data of a vehicle black box; a communication unit for communicating with the vehicle black box; and a controller for acquiring present posture data by analyzing data received from the vehicle black box and for determining whether the stored normal posture data corresponds with the acquired present posture data.

According to another aspect of the present invention, a vehicle navigation apparatus includes: an output unit for outputting data; a communication unit for communicating with a vehicle black box; and a controller for controlling a first sensor for determining a slope of the vehicle black box to acquire slope data and controlling the slope data to output to the output unit.

According to another aspect of the present invention, a vehicle navigation apparatus includes: a display unit; a communication unit for communicating with a vehicle black box; and a controller for controlling to receive an image from the vehicle black box and to acquire a first reference line from a specific object included in the received image and to display the first reference line in the display unit, and to display a second reference line for acquiring a slope from the first reference line to be adjacent to the first reference line.

According to another aspect of the present invention, a method of inducing a black box of a navigation system to a normal position, the method includes: receiving, by a vehicle navigation apparatus, data from a vehicle black box; acquiring present posture data of the vehicle black box by analyzing the received data; and determining whether the acquired present posture data corresponds with previously stored normal posture data of the vehicle black box.

According to another aspect of the present invention, a method of inducing a black box of a navigation system to a normal position, the method including: receiving, by a vehicle navigation apparatus, an image from a vehicle black box; acquiring and displaying a first reference line from a specific object included in the received image; and displaying a second reference line for determining a slope from the first reference line to be adjacent to the first reference line.

Advantageous Effects

In a method of inducing a black box of a vehicle navigation apparatus and a navigation system to a normal position according to the present invention, by analyzing data acquired through the vehicle black box, a posture or a position of the vehicle black box, a camera provided in the vehicle black box, or a camera installed in the vehicle is determined and the posture or the position is corrected to a normal posture or a normal position, and by correcting the posture or the position to enable a driver to a wrong image not to photograph, when a vehicle accident occurs, a photographed image and related data can be used as a reference material for determining details of the accident and a negligence ratio.

Further, due to a repeated vibration or acceleration of the vehicle, a position of a camera deviates from a normal position and by notifying this in advance to a driver, the driver can correct a vehicle black box, a camera provided in the vehicle black box, or a camera installed in the vehicle to a normal position.

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. The same reference numbers will be used throughout this specification to refer to the same or like parts.

In the following description of the present invention, a detailed description of known functions and configurations incorporated herein will be omitted when it may obscure the subject matter of the present invention. Further, numerals (e.g. first, second, etc.) used to describe the present invention are merely identifiers for discriminating one component from other components.

A navigation system according to the present invention will now be described in detail with reference to the attached drawings. The terms "module" and "part" used to signify components are used herein to help the understanding of the components and thus they should not be considered as having specific meanings or roles.

Figure 1:
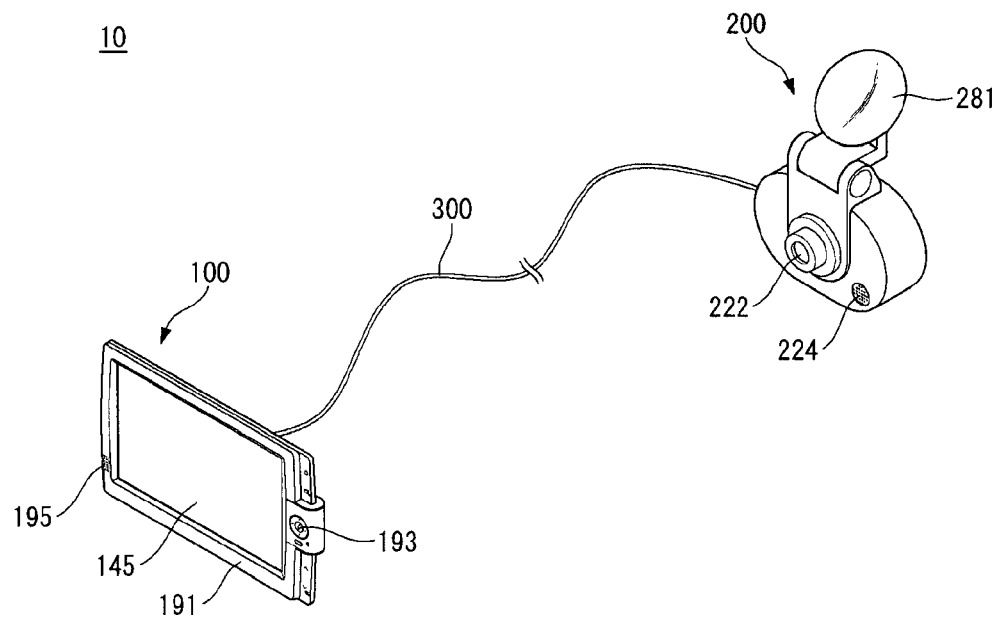
FIG. 1 is a perspective view illustrating a navigation system according to an embodiment of the present invention.

FIG. 1 is a perspective view illustrating a navigation system according to an embodiment of the present invention.

As shown in FIG. 1, a navigation system 10 according to an embodiment of the present invention includes a vehicle navigation apparatus 100 and a vehicle black box 200.

The navigation system 10 is a system that notifies a driver and a fellow passenger of a vehicle of various data related to driving and maintenance of the vehicle. The navigation system 10 may be the vehicle navigation apparatus 100 as a narrow meaning and may include various electronic devices that operate in interlock with the vehicle navigation apparatus 100 using wired and wireless as a wide meaning.

That is, by connecting various electronic devices that can supplement and enhance a function of the vehicle navigation apparatus 100 to the vehicle navigation apparatus 100, an integrated navigation system 10 may be formed. An electronic device that may form the navigation system 10 by interlocking with the vehicle navigation apparatus 100 may be a mobile terminal and a remote control that can connect to a mobile communication network.

Further, an electronic device connected to the vehicle navigation apparatus 100 to form the navigation system 10 may include the vehicle black box 200. The vehicle black box 200 may be provided integrally with or separately from the vehicle navigation apparatus 100. That is, in FIG. 1, the vehicle black box 200 provided separately from the vehicle navigation apparatus 100 is connected through a communication cable 300, but the vehicle black box 200 may be formed integrally with the vehicle navigation apparatus 100.

The vehicle navigation apparatus 100 includes a display unit 145, a navigation manipulating key 193, and a navigation microphone 195 provided at a front surface of a navigation housing 191.

The navigation housing 191 forms an external appearance of the vehicle navigation apparatus 100. The vehicle navigation apparatus 100 may be exposed to an environment of various conditions such as exposure to a high temperature or a low temperature due to a seasonal factor and a direct/indirect outside impact. The navigation housing 191 has a purpose of protecting various electronic components within the vehicle navigation apparatus 100 from a change of an outside environment and enhancing an external appearance of the vehicle navigation apparatus 100. In order to achieve such a purpose, the navigation housing 191 may be formed by injection molding an element such as ABS, PC, or engineering plastic having reinforced strength.

The display unit 145 is an element that visually displays various data. Various data displayed in the display unit 145 may be map data to which route data is coupled, various broadcasting screens including DMB broadcasting, or an image stored at a memory. The display unit 145 may be physically or logically divided into several pieces.

In the physically divided display unit 145, two or more display units 145 are adjacently provided. In the logically divided display unit 145, a plurality of independent screens are displayed in a physically single display unit 145. For example, while receiving and displaying DMB broadcasting, route data may be displayed in a partial area of the display unit 145, or DMB broadcasting and a map screen may be displayed in a partial area and another area, respectively, of the display unit 145.

According to a tendency in which various functions are converged to the vehicle navigation apparatus 100, a case of logically dividing the display unit 145 and displaying various data gradually increases. Furthermore, in order to display various data, the display unit 145 gradually has a large screen.

An entire surface or a portion of the display unit 145 may be a touch screen that can receive a user's touch input. For example, by touching a function selection button displayed in the display unit 145, a function thereof may be activated. That is, the display unit 145 may be an input unit (120 of FIG. 3) while being an output unit of an image (140 of FIG. 3).

A navigation manipulating key 193 is provided to execute various functions of the vehicle navigation apparatus 100 or to enable a user to directly input necessary data. By mapping a frequently using specific function to the navigation manipulating key 193, use convenience can be improved.

The navigation microphone 195 is provided to receive a voice and sound. For example, a specific function of the vehicle navigation apparatus 100 may be executed based on a voice signal received by the navigation microphone 195. Further, a present state of the vehicle such as occurrence of an accident may be detected based on a sound signal received by the navigation microphone 195.

The vehicle black box 200 stores data necessary for an accident processing process of the vehicle by exchanging a signal with the vehicle navigation apparatus 100. For example, when an accident occurs while driving the vehicle, by analyzing image data in which the vehicle black box 200 acquires and stores, the image data may be used for determining details and a negligence ratio of the accident. Further, the vehicle black box 200 connected to the vehicle navigation apparatus 100 may use various data stored at the vehicle navigation apparatus 100. For example, by mapping an image acquired from the vehicle black box 200 to map data stored at the vehicle navigation apparatus 100, effectiveness of the vehicle black box 200 may increase.

The vehicle black box 200 acquires vehicle data while driving and stopping the vehicle. That is, the vehicle black box 200 may photograph an image while driving the vehicle and photograph an image even when the vehicle stops. A picture quality of an image acquired through the vehicle black box 200 may be constant or be changed. For example, before and after an accident occurs, by increasing a picture quality of an image, and in a normal case, by decreasing a picture quality of an image, while minimizing requested storage space, a central image may be stored.

The vehicle black box 200 includes a black box camera 222, a black box microphone 224, and an attachment portion 281.

The black box camera 222 may photograph the outdoor or the indoor of the vehicle. Further, the black box camera 222 may be provided in the singular number or the plural number. When a plurality of black box cameras 222 exist, one black box camera 222 is formed integrally with the vehicle black box 200, and the remaining black box cameras 222 transmit an image photographed with attached to each portion of the vehicle to the vehicle black box 200. When a single black box camera 222 exists, the black box camera 222 is installed to photograph the front of the vehicle. An image photographed by the black box camera 222 is stored at the vehicle black box 200 or the vehicle navigation apparatus 100.

The black box microphone 224 acquires sound generating in the inside and the outside of the vehicle. The black box microphone 224 performs a function similar to that of the navigation microphone 195.

The attachment portion 281 fixes the vehicle black box 200 to the vehicle. The attachment portion 281 may be an absorption plate that can attach the vehicle black box 200 to front glass of the vehicle or a fixing device that can couple the vehicle black box 200 to a room mirror of the vehicle.

Figure 2:
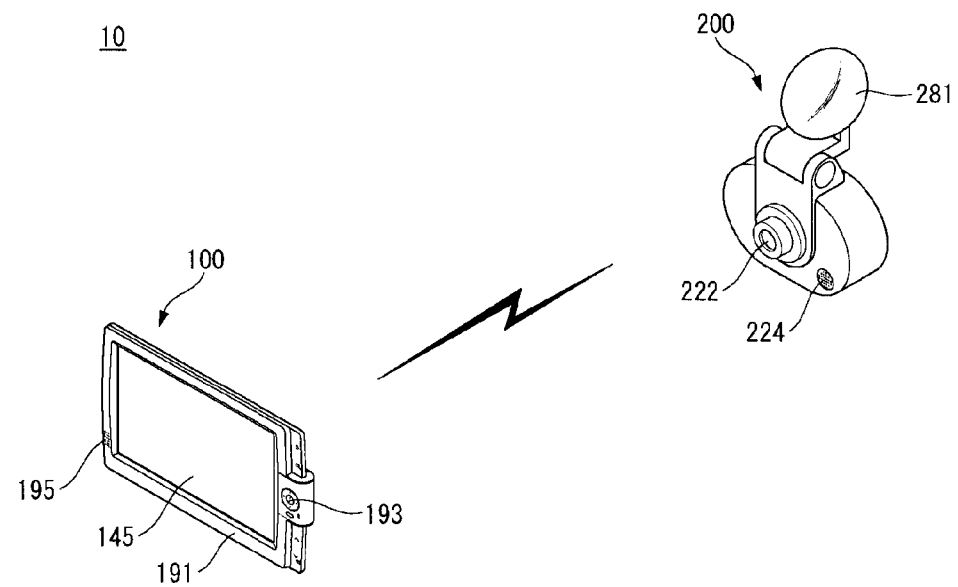
FIG. 2 is a perspective view illustrating a navigation system according to another embodiment of the present invention.

FIG. 2 is a perspective view illustrating a navigation system according to another embodiment of the present invention, and in FIG. 2, only a portion different from an embodiment of the present invention will be described.

A navigation system 10 according to another embodiment of the present invention connects a vehicle navigation apparatus 100 and a vehicle black box 200 using wireless. That is, the vehicle navigation apparatus 100 and the vehicle black box 200 are separate devices, and a physical connection device may not exist between the vehicle navigation apparatus 100 and the vehicle black box 200. The vehicle navigation apparatus 100 and the vehicle black box 200 communicate through Bluetooth, Radio Frequency Identification (RFID), Infrared Data Association (IrDA), Ultra Wideband (UWB), and ZigBee.

Figure 3:
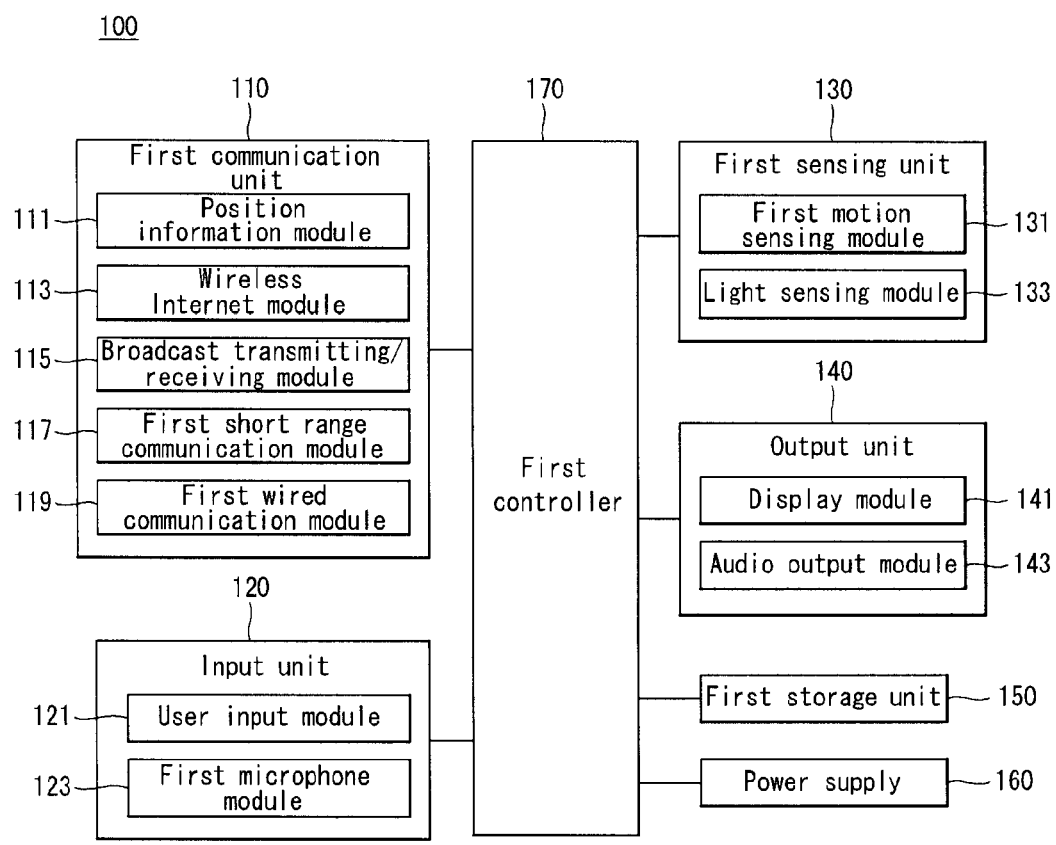
FIG. 3 is a block diagram illustrating a configuration of a vehicle navigation apparatus of FIG. 1.

FIG. 3 is a block diagram illustrating a configuration of a vehicle navigation apparatus of FIG. 1.

As shown in FIG. 3, the vehicle navigation apparatus 100 according to an embodiment of the present invention includes a first communication unit 100, an input unit 120, a first sensing unit 130, an output unit 140, a first storage unit 150, a power supply 160, and a first controller 170.

The first communication unit 100 is provided to enable the vehicle navigation apparatus 100 to communicate with another device. The first communication unit 100 is a device that enables a position data module 111, a wireless Internet module 113, and a broadcast transmitting position data module 111 to acquire position data through a Global Navigation Satellite System (GNSS). The GNSS is a navigation system that can calculate a position of a receiving terminal using an electric wave signal that receives from an artificial satellite (20 of FIG. 5). A detailed example of the GNSS may be a Global Positioning System (GPS), Galileo, a Global Orbiting Navigational Satellite System (GLONASS), a COMPASS, an Indian Regional Navigational Satellite System (IRNSS), and a Quasi-Zenith Satellite System (QZSS) according to an operation subject thereof. The position data module 111 of the vehicle navigation apparatus 100 according to an embodiment of the present invention receives a GNSS signal servicing in a use area of the vehicle navigation apparatus 100, thereby acquiring position data.

The wireless Internet module 113 is a device that acquires or transmits data by connecting to wireless Internet. Wireless Internet that can connect through the wireless Internet module 113 may be a wireless LAN (WLAN), a wireless broadband (Wibro), world interoperability for microwave access (Wimax), and High Speed Downlink Packet Access (HSDPA).

The broadcast transmitting/receiving module 115 is a device that transmits and receives a broadcasting signal through various broadcasting systems. A broadcasting system that can transmit and receive through the broadcast transmitting/receiving module 115 may be Digital Multimedia Broadcasting Terrestrial (DMBT), a Digital Multimedia Broadcasting Satellite (DMBS), Media Forward Link only (MediaFLO), Digital Video Broadcast Handheld (DVBH), and Integrated Services Digital Broadcast Terrestrial (ISDBT). A broadcasting signal that is transmitted and received through the broadcast transmitting/receiving module 115 may include traffic data and life data.

The short range communication module 117 is a device for short range communication. As described above, the short range communication module 117 communicates through Bluetooth, Radio Frequency Identification (RFID), Infrared Data Association (IrDA), Ultra WideBand (UWB), and ZigBee.

The first wired communication module 119 is an interface device that can connect the vehicle navigation apparatus 100 to another device using a wire. The first wired communication module 119 may be an USB module that can communicate through an USB port. The vehicle navigation apparatus 100 according to an embodiment and another embodiment of the present invention communicates with another device through the short range communication module 117 or the first wired communication module 119, as needed. Furthermore, when communicating with a plurality of devices, one device may communicate with the short range communication module 117, and another device may communicate through the first wired communication module 119.

The input unit 120 is a device that converts a physical input from the outside of the vehicle navigation apparatus 100 to a specific electric signal. The input unit 120 includes a user input module 121 and a first microphone module 123.

The user input module 121 is a key input device that enables a user to input through a push action. The user input module 121 may be embodied as a navigation manipulating key (193 of FIG. 1) provided at the outside of a housing (191 of FIG. 1) of the vehicle navigation apparatus 100.

The first microphone module 123 is a device that receives a user voice and sound generated at the inside and the outside of the vehicle. The first microphone module 123 may be embodied as a navigation microphone 195 provided at the outside of the housing (191 of FIG. 1) of the vehicle navigation apparatus 100.

The first sensing unit 130 is a device that can detect a present state of the vehicle navigation apparatus 100. The first sensing unit 130 includes a first motion sensing module 131 and a light sensing module 133.

The first motion sensing module 131 detects a motion in three-dimensional space of the vehicle navigation apparatus 100. The first motion sensing module 131 includes a three-axis terrestrial magnetic sensor and a three-axis acceleration sensor. By coupling motion data that acquires through the first motion sensing module 131 to position data that acquires through the position data module 111, a more accurate trace of the vehicle that attaches the vehicle navigation apparatus 100 may be calculated.

The light sensing module 133 is a device that measures peripheral illuminance of the vehicle navigation apparatus 100. The light sensing module 133 may change brightness of the display unit 145 to correspond to peripheral brightness using illumination data that acquires through the light sensing module 133.

The output unit 140 is a device that enables the vehicle navigation apparatus 100 to output data. The output unit 140 includes a display module 141 and an audio output module 143.

The display module 141 is a device that outputs data in which a human can visually recognize in the vehicle navigation apparatus 100. The display module 141 may be embodied as the display unit (145 of FIG. 1) provided at a front surface of the housing (191 of FIG. 1) of the vehicle navigation apparatus 100. When the display module 141 is a touch screen, the display module 141 performs a function of the input unit 120 while being the output unit 140 of data.

The audio output module 143 is a device that outputs data in which a human can aurally recognize in the vehicle navigation apparatus 100. The audio output module 143 may be embodied as a speaker that expresses data in which the vehicle navigation apparatus 100 should notify to a user including a driver with sound.

The first storage unit 150 is a device that stores data generated by data and operation necessary for operating the vehicle navigation apparatus 100. The first storage unit 150 may be a memory provided at the inside of the vehicle navigation apparatus 100, or a detachable memory. Data necessary for operating the vehicle navigation apparatus 100 may include an operating system (OS), a route search application, and a map. Further, data generated by operation of the vehicle navigation apparatus 100 may be found route data and a received image.

The power supply 160 is a device that supplies power necessary for operation of the vehicle navigation apparatus 100 or operation of another device connected to the vehicle navigation apparatus 100. The power supply 160 is a device that receives supply of power from a battery provided within the vehicle navigation apparatus 100 or external power such as a vehicle. Further, the power supply 160 may be embodied as the first wired communication module 119 or may be a device that receives supply of power using wireless according to a form that receives supply of power.

The first controller 170 is a device that outputs a control signal of controlling various operations of the vehicle navigation apparatus 100. Furthermore, the first controller 170 may output a control signal of controlling another device connected to the vehicle navigation apparatus 100.

Figure 4:
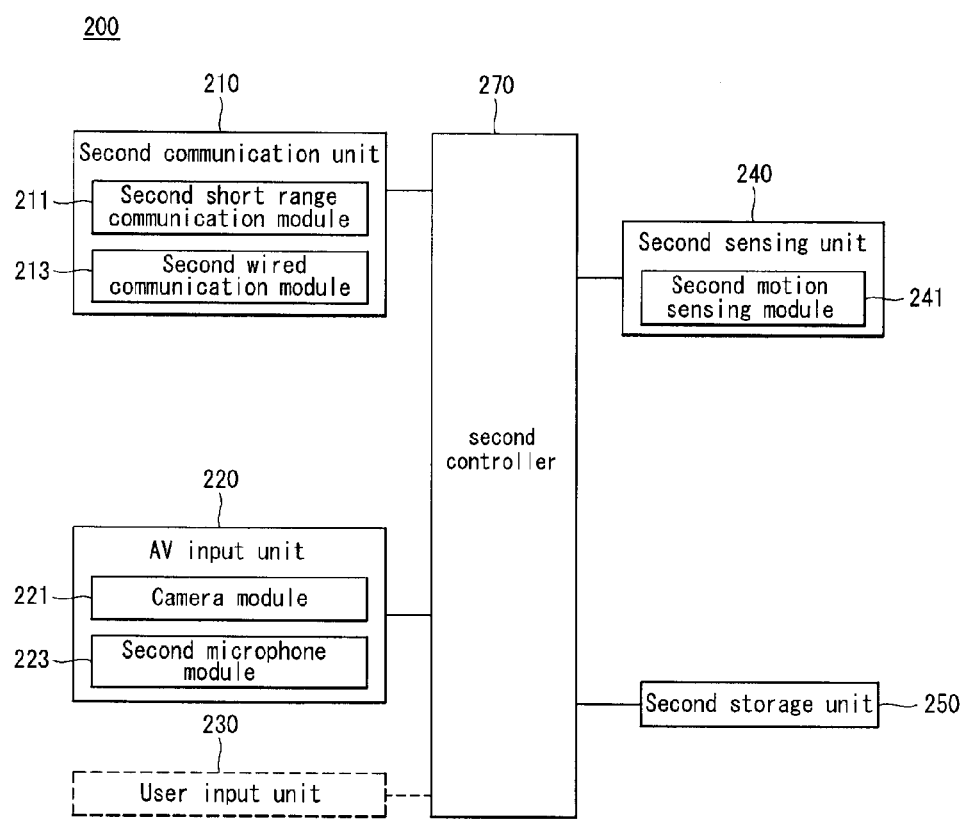
FIG. 4 is a block diagram illustrating a configuration of a vehicle black box of FIG. 1.

FIG. 4 is a block diagram illustrating a configuration of a vehicle black box of FIG. 1.

As shown in FIG. 4, the vehicle black box 200 according to an embodiment of the present invention includes a second communication unit 210, an AV input unit 220, a user input unit 230, a second sensing unit 240, and a second storage unit 250.

The second communication unit 210 is a device that can communicate with the first communication unit 110 or another device of the vehicle navigation apparatus (100 of FIG. 3). The second communication unit 210 includes a second short range communication module 211 and a second wired communication module 213. The second short range communication module 211 communicates with the first short range communication module (117 of FIG. 3), and the second wired communication module 213 communicates with the first wired communication module 119.

The AV input unit 220 is a device that can acquire sound and an image. The AV input unit 220 includes a camera module 221 and a second microphone module 223.

The camera module 221 acquires an image of the inside and the outside of the vehicle in which the vehicle black box 200 is mounted. The camera module 221 may be embodied as the black box camera (222 of FIG. 1), as described above.

The second microphone module 223 acquires sound generated at the inside and the outside of a vehicle. The sound acquired through the second microphone module 223 may be used for controlling operation of the vehicle black box 200. For example, when sound stronger than that of ordinary times is received through the second microphone module 223, the camera module 221 may acquire an image of a higher resolution. The second microphone module 223 may be embodied as the black box microphone 224.

The user input unit 230 is a device provided to enable the user to directly manipulate operation of the vehicle black box 200. The user input unit 230 may be embodied as a push button (not shown) provided at the outside of the vehicle black box 200. However, when the vehicle black box 200 is controlled by a control signal of the first controller (170 of FIG. 3) of the vehicle navigation apparatus (100 of FIG. 3), the user input unit 230 may be excluded from the vehicle black box 200.

The second sensing unit 240 is a device that can detect a present state of the vehicle black box 200. The second sensing unit 240 may include a second motion sensing module 241, and the second sensing unit 240 performs operation similar to that of the first motion sensing module (131 of FIG. 3), except for an installed position. When the second sensing unit 240 is provided in the vehicle black box 200, the second sensing unit 240 may not receive data related to a motion of three-dimensional space from the vehicle navigation apparatus 100.

The second storage unit 250 is a device that stores data generated by data and operation necessary for operation of the vehicle black box 200. Data stored at the second storage unit 250 may be an image acquired through the camera module 221. The second storage unit 250 may be a memory provided within the vehicle black box 200, or detachable from the vehicle black box 200.

The second controller 270 is a device that outputs a control signal of controlling various operations of the vehicle black box 200. The second controller 270 may be affected by a control signal of the first controller (170 of FIG. 3) of the vehicle navigation apparatus (100 of FIG. 3). That is, the second controller 270 may be dependent on the first controller 170.

Figure 5:
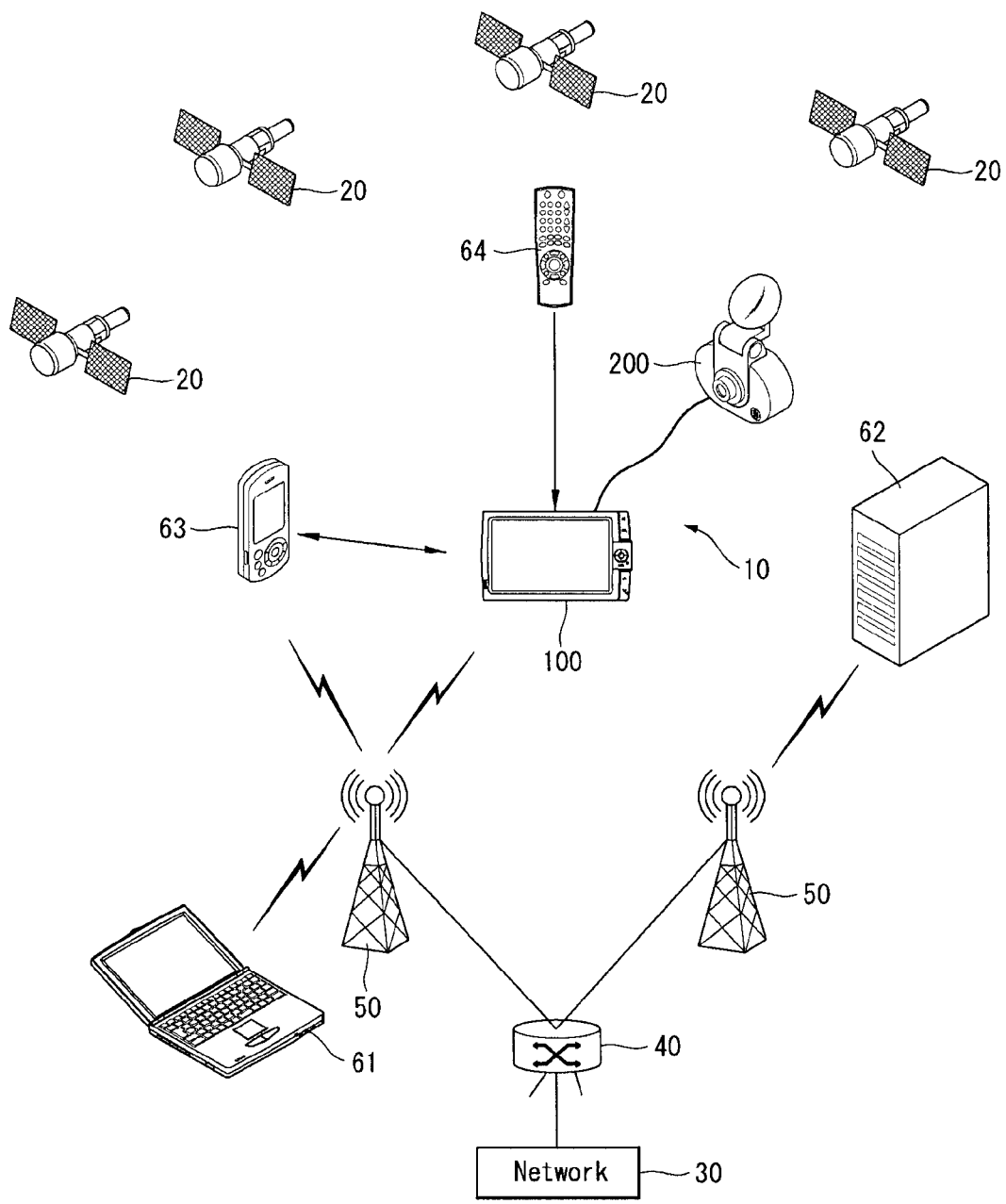
FIG. 5 is a diagram illustrating a communication network including the navigation system of FIG. 1.

FIG. 5 is a diagram illustrating a communication network including the navigation system of FIG. 1.

As shown in FIG. 5, the navigation system 10 according to an embodiment of the present invention may be connected to various communication networks and other electronic devices 61 to 64.

The navigation system 10 calculates a present position using an electric wave signal that receives from the artificial satellite 20. Each artificial satellite 20 may transmit an L band frequency having different frequency bands. The navigation system 10 calculates a present position based on a time consumed when an L band frequency transmitted from each artificial satellite 20 arrives the navigation system 10.

The navigation system 10 connects using wireless to the controller 40 (ACR) through the first communication unit (110 of FIG. 3) and to the network 30 through the base station 50 (RAS). When the navigation system 10 connects to the network 30, by indirectly connecting to electronic devices 61 and 62 connected to the network 30, data may be exchanged.

The navigation system 10 may be indirectly connected to the network 30 through another device 63 having a communication function. For example, when a device that may be connected to the network 30 is not provided in the navigation system 10, the navigation system 10 may communicate with another device 63 having a communication function through the first short range communication module (117 of FIG. 3).

Hereinafter, a method of inducing a black box of a vehicle navigation apparatus and a navigation system to a normal position according to an embodiment of the present invention will be described in detail.

First, a terminal for inducing the vehicle black box 200 or the camera 221 or 222 of the vehicle black box to a normal position based on data received from the vehicle black box 200 according to an embodiment of the present invention will be described with reference to FIGS. 6 to 12.

Figure 6:
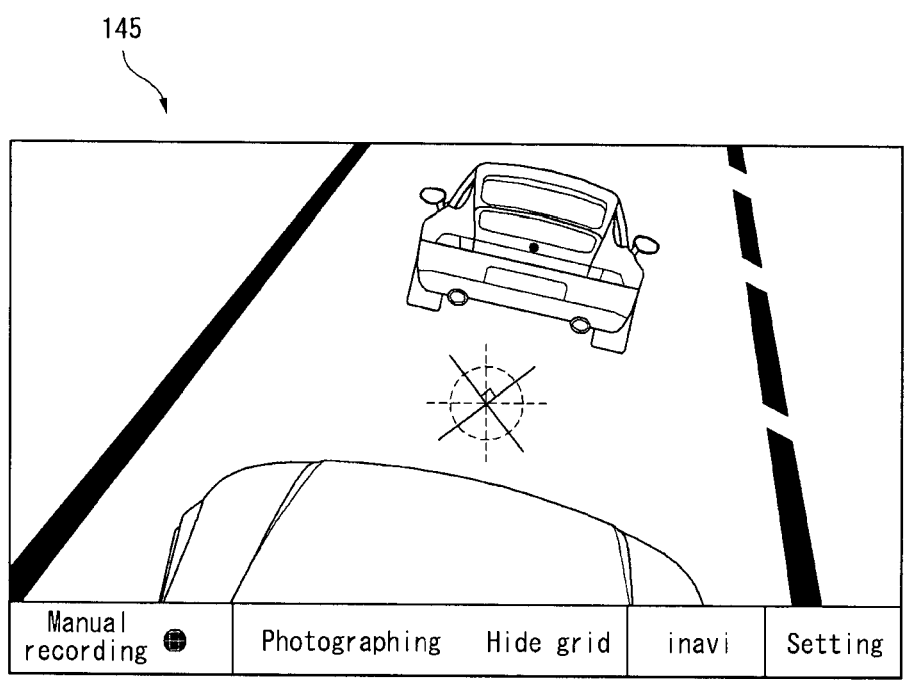
FIGS. 6 to 12 illustrate a screen of a vehicle navigation apparatus according to an embodiment of the present invention.

FIG. 6 illustrates a screen of the display unit 145 of a vehicle navigation apparatus according to an embodiment of the present invention.

The vehicle navigation apparatus 100 stores normal posture data of the vehicle black box 200 at the first storage unit 150 of the vehicle navigation apparatus 100. The camera 221 may be provided within the vehicle black box 200 or the camera module 222 may be provided at the outside of the vehicle black box 200, and normal posture data of the vehicle black box 200 includes normal posture data of the camera module 222 provided at the outside of the vehicle black box 200 as well as normal posture data of the vehicle black box 200.

The vehicle navigation apparatus 100 acquires data acquired by the vehicle black box 200 from the second communication unit 210 through the first communication unit 110. The acquired data indicates all data acquired by the vehicle black box 200 including voice data, image data, and character data.

The first controller 170 of the vehicle navigation apparatus 100 acquires present posture data of the vehicle black box 200 by analyzing data acquired from the vehicle black box 200. For example, the first controller 170 may acquire a reference line from a pixel of similar contrast data by analyzing each pixel of the acquired image data, or may acquire present posture data of the vehicle black box 200 by acquiring a coordinate value of three-dimensional space from the second sensing unit 240 provided in the vehicle black box 200. Therefore, when comparing the acquired present posture data with normal posture data stored at the first storage unit 150, it can be determined whether the camera module 222 installed in the vehicle black box 200 or the vehicle deviates from a normal position.

A cross line formed with a dotted line that passes through the center of a circle shown in FIG. 6 is formed by displaying the previously stored normal posture data on a screen of the display unit 145, and a cross line formed with a solid line indicates the present posture data, and a driver or a user may know an inclined degree of the camera module 222 installed in the vehicle black box 200 or the vehicle from a slope of both cross lines, or may receive voice guidance of an inclined degree of the camera module 222 installed in the vehicle black box 200 or the vehicle through the audio output module of the vehicle navigation apparatus 100.

When the vehicle in which the vehicle black box 200 is installed starts or brakes, an impact is applied to the vehicle, and while the vehicle runs, a repeated vibration is applied to the vehicle by a speed bump, a steep slope, or a sharp curve and thus the camera 221 or the camera module 222 may photograph a wrong image and thus it is necessary to often determine a posture of the camera 221 or the camera module 222. Therefore, present posture data of the vehicle black box 200 may be displayed on a screen at a preset time point or a predetermined time interval or may be notified by a voice to a driver. Further, when an event occurs, present posture data may be guided, and the event indicates physical events applied to the vehicle such as engine starting, sudden acceleration, sudden deceleration, sudden stop, and sudden handle operation of the vehicle.

Further, a user or a driver adjusts a posture or a position of the camera module 221 to a normal posture or a normal position by directly manipulating the camera module 221 installed in the vehicle black box 200 or the vehicle, and the first controller 170 of the vehicle navigation apparatus 100 controls a pan/tilt drive module (not shown) provided in the vehicle black box 200 to automatically adjusts a posture or a position of the camera module 221 to a normal posture or a normal position. The pan/tilt drive module performs a function of adjusting the camera 222 or the camera module 221 to the front/rear/left/right. When cross lines passing through the center of a circle shown in FIG. 6 correspond, the user or the driver directly manipulates the input unit 120 of the vehicle navigation apparatus 100 while viewing a screen of the display unit 145 and thus corrects a posture or a position of the vehicle black box 200 or the camera module 221 to a normal posture or a normal position.

Figure 7:
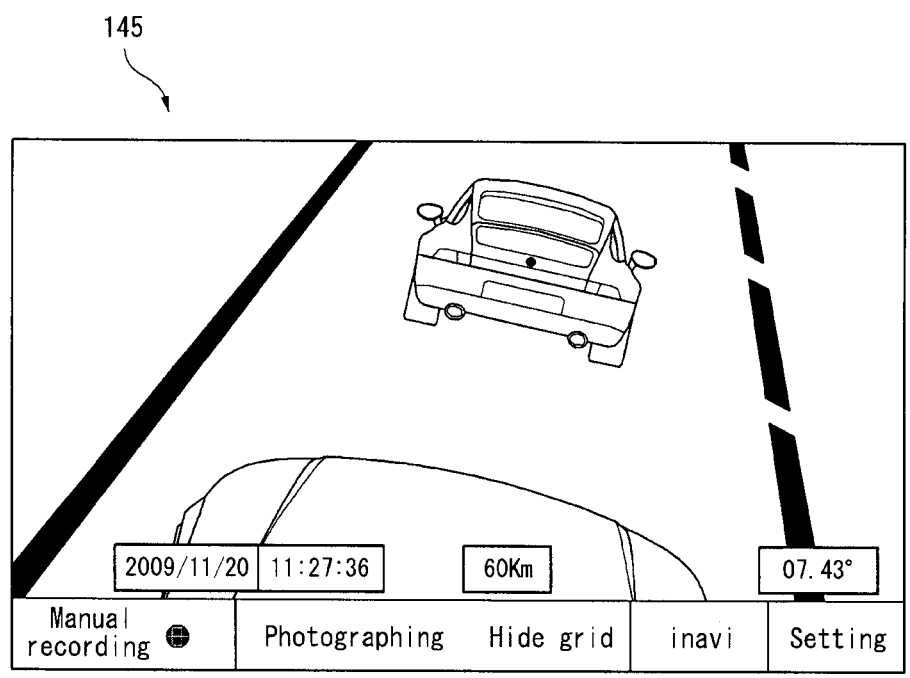
Figure 8:
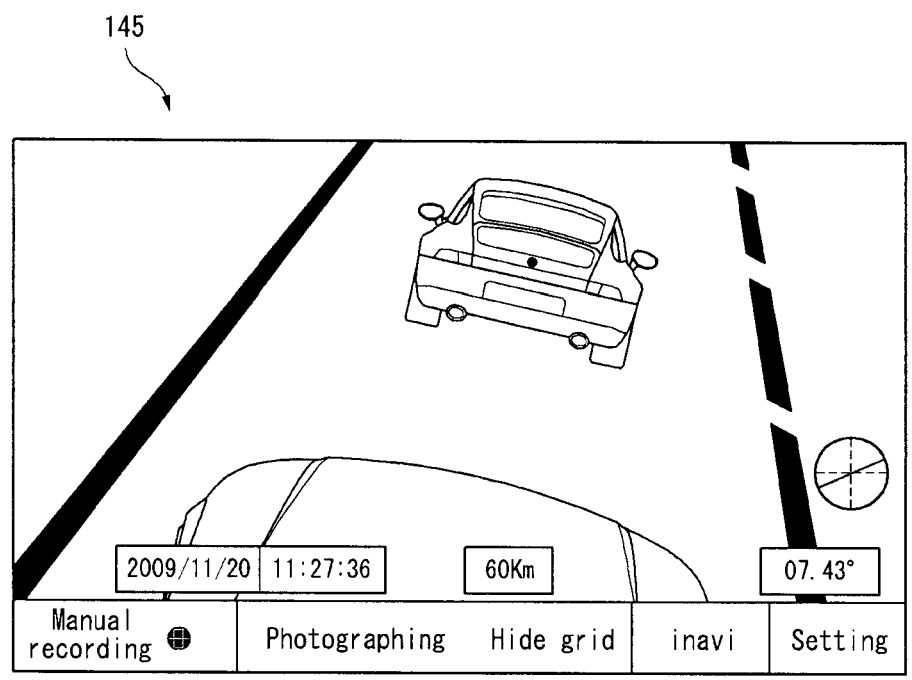

FIGS. 7 and 8 are diagrams illustrating a screen of the display unit 145 of a vehicle navigation apparatus according to another embodiment of the present invention.

As described above, a first motion sensing module 131 of the vehicle navigation apparatus 100 may include a three-axis terrestrial magnetic sensor or a three-axis acceleration sensor, and the second motion sensing module 241 of the vehicle black box 200 performs a function similar to that of the first motion sensing module 131. Further, a three-axis terrestrial magnetic sensor or a three-axis acceleration sensor may be provided even in the camera module 221 installed separately from the vehicle black box 200 as well as the vehicle navigation apparatus 100 and the vehicle black box 200.

The three-axis terrestrial magnetic sensor provided in the first sensing unit 130 and/or the second sensing unit 240 may search for an orientation like a compass by grasping a flow of a magnetic field occurring in the earth, and the three-axis acceleration sensor may be used for detecting a slope or a vibration of the terminal.

Therefore, when the vehicle black box 200 is not in a horizontal state or when the camera module 221 is not in a horizontal state, slope data acquired from the sensing unit may be displayed in the display unit 145 of the vehicle navigation apparatus 100, or may be output through the output unit 140 of the vehicle navigation apparatus 100.

For example, 07.43° displayed at the right side of the lower end of FIG. 7 represents slope data of the vehicle black box 200 or the camera module acquired from the vehicle black box 200, and as shown in FIG. 8, a graphic element that visually expresses the slope data on a screen of the display unit 145 may be visually displayed on the shown 07.43°. The graphic element includes various visual shapes that can compare a slope such as a circle, a line passing through the center of the circle, a grid line, and a cross line formed with a square visually displayed on 07.43° of the lower end of the left side of FIG. 8.

Further, present posture data or position data of the vehicle black box 200 may be guided to the driver by a voice through the audio output module 143 of the vehicle navigation apparatus 100 as well as image or character data, and data guided by a voice includes angle data necessary for forming horizontality as well as the slope data.

As described above, in a vehicle in which the vehicle black box 200 is installed, because the camera 222 or the camera module 221 may photograph an wrong image by a repeated vibration, present posture data of the vehicle black box 200 may be displayed on a screen or may be notified to the driver by a voice periodically or whenever a specific event occurs.

FIGS. 9 to 12 illustrate examples of a screen of the display unit 145 of a vehicle navigation apparatus according to another embodiment of the present invention.

Figure 9:
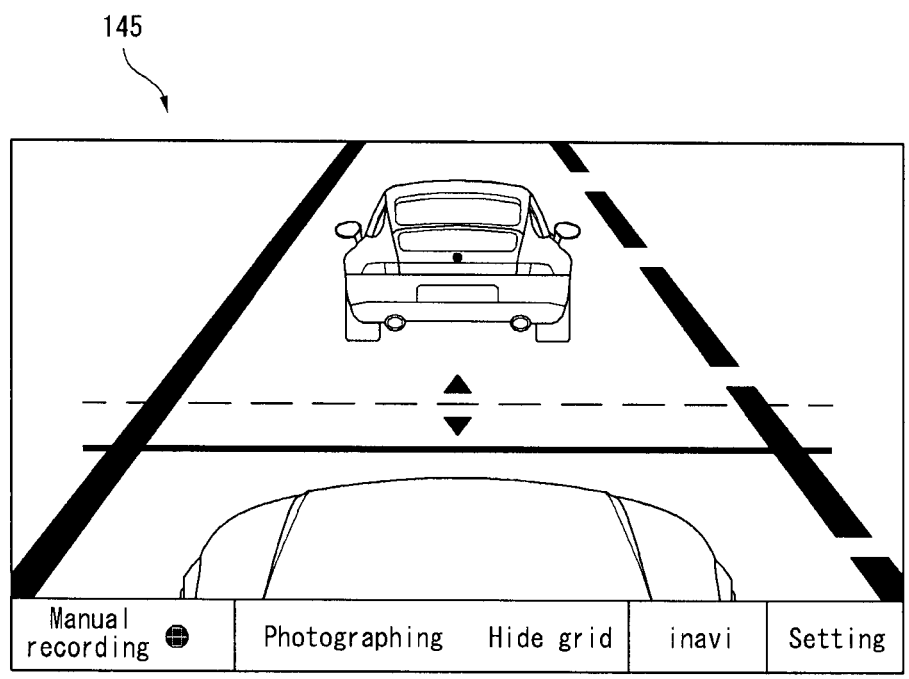

FIG. 9 illustrates the display unit 145 that acquires a first reference line by analyzing an image from a specific object included in an image received from the vehicle black box 200 and that displays the first reference line and a second reference line for comparing with the first reference line in the display unit 145 of the vehicle navigation apparatus 100.

A specific object included in the image indicates all objects that can identify by an image analysis technique such as front and rear vehicles, a number plate of the vehicle, a central line of a road, a hood of the vehicle, and a road, and image analysis includes an image processing method and object recognition algorithm for identifying a specific object of an image such as multi-resolution analysis, edge detection, wavelet analysis, Euclidean distance transform, and feature analysis.

The first controller 170 of the vehicle navigation apparatus 100 recognizes an object by analyzing an image received from the vehicle black box 200 through the first communication unit 110, acquires a first reference line from the object, displays the first reference line in the display unit 145, displays the first reference line and a second reference line for comparing a slope to be adjacent to the first reference line, and thus the driver can determine whether the vehicle black box 200 or the camera module 221 deviates from a normal posture or a normal position, and the first reference line may be vertically moved and thus determine a slope from the second reference line.

For example, in FIGS. 9 to 12, the first reference line is acquired from a hood of the vehicle, displayed in the display unit 145 of the vehicle navigation apparatus 100, and the second reference line is displayed adjacent to first reference line.

In FIG. 9, because a first reference line shown in a solid line and a second reference line shown in a dotted line are parallel, it can be determined that an image received from the vehicle black box 200 are accurately photographed without being inclined based on a hood of the vehicle.

Figure 10:
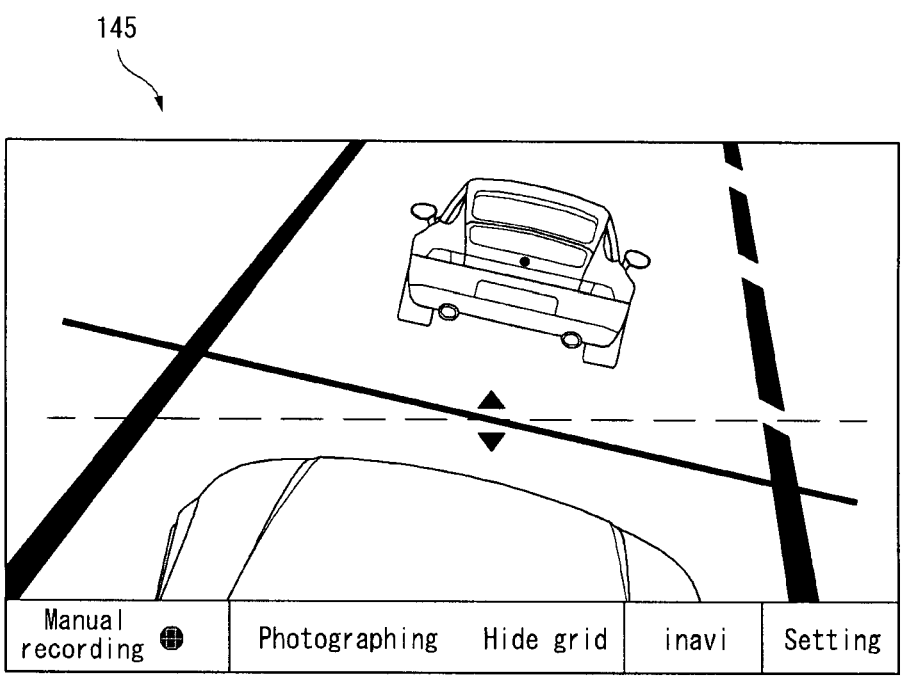

However, as shown in FIG. 10, when a first reference line shown in a solid line and a second reference line shown in a dotted line are inclined, it can be determined that an image received from the vehicle black box 200 is wrongly photographed with inclined based on a hood of the vehicle, and when the vehicle black box 200 or the camera module 221 is inclined, the driver can determine that an image is wrongly photographed with an inclined degree of the first reference line and the second reference line displayed in the display unit 145 of the vehicle navigation apparatus 100.

Further, the driver may receive guidance data including data about slopes of the first reference line and the second reference line or angle data necessary for making the first reference line and the second reference line in parallel through the audio output module 143 of the vehicle navigation apparatus 100.

As described above, in a vehicle in which the vehicle black box 200 is installed, because the camera 222 or the camera module 221 may photograph a wrong image by a repeated vibration, guidance data including angle data necessary for making the first reference line and the second reference line in parallel or slope data formed by the first reference line and the second reference line may be displayed on a screen or sounded by a voice to the driver periodically or whenever a specific event occurs.

Figure 11:
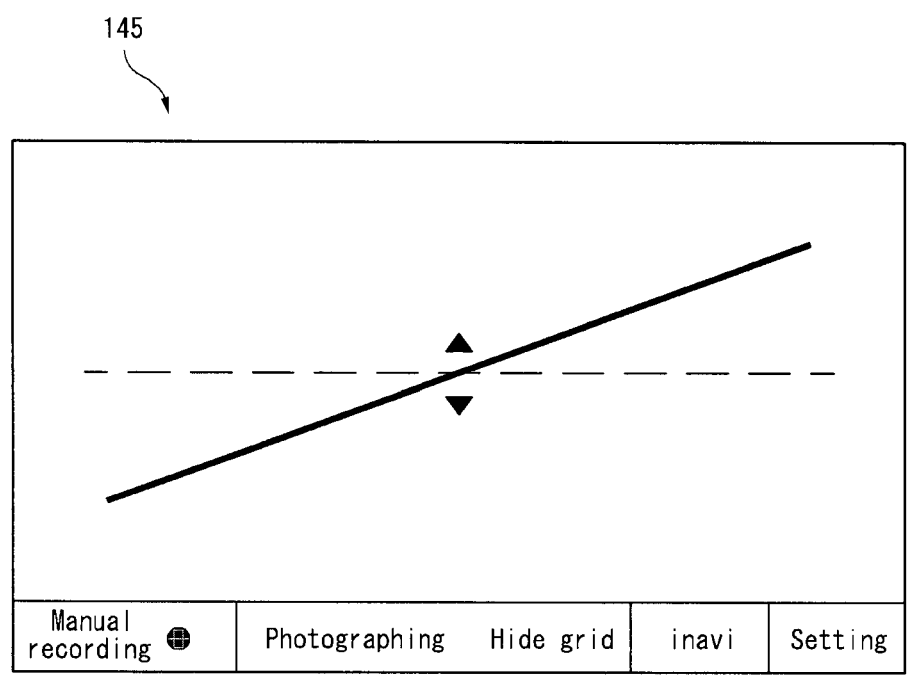

By analyzing an image received from the vehicle black box 200, an object is recognized, and when the first reference line is acquired from the object and the first reference line is displayed in the display unit 145 of the vehicle navigation apparatus 100 and the first reference line and a second reference line for comparing a slope to be adjacent to the first reference line are displayed, the first reference line and the second reference line may be displayed together on the received image, and as shown in FIG. 11, in order for the driver to visually quickly recognize an inclined degree of the first reference line and the second reference line, the first reference line and the second reference line may be displayed together on another background screen that replaces the received image.

Further, as described above, the driver or the user can adjust a posture or a position of the vehicle black box 200 or the camera module 221, a posture or a position of the vehicle black box 200 or the camera module 221 can be automatically adjusted to a normal posture or a normal position through a pan/tilt drive module (not shown) provided in the vehicle black box 200, and the driver or the user can correct the vehicle black box 200 or the camera module 221 to a normal posture or a normal position by directly manipulating the input unit 120 of the vehicle navigation apparatus 100 while viewing a screen of the display unit 145 displayed in FIG. 10.

As described above, the vehicle navigation apparatus 100 and/or the vehicle black box 200 may include a three-axis terrestrial magnetic sensor or a three-axis acceleration sensor, and a three-axis terrestrial magnetic sensor or a three-axis acceleration sensor may be provided even in the camera module 221 installed separately from the vehicle black box 200 as well as the vehicle navigation apparatus 100 and the vehicle black box 200.

The three-axis acceleration sensor acquires speed data, acceleration data, and impact data of the vehicle, and if the acquired data is equal to or larger than a preset reference, by displaying the first reference line and the second reference line in the display unit 145 of the vehicle navigation apparatus 100, the driver can immediately determine that the vehicle black box 200 or the camera module 221 deviates from a normal position.

Figure 12:
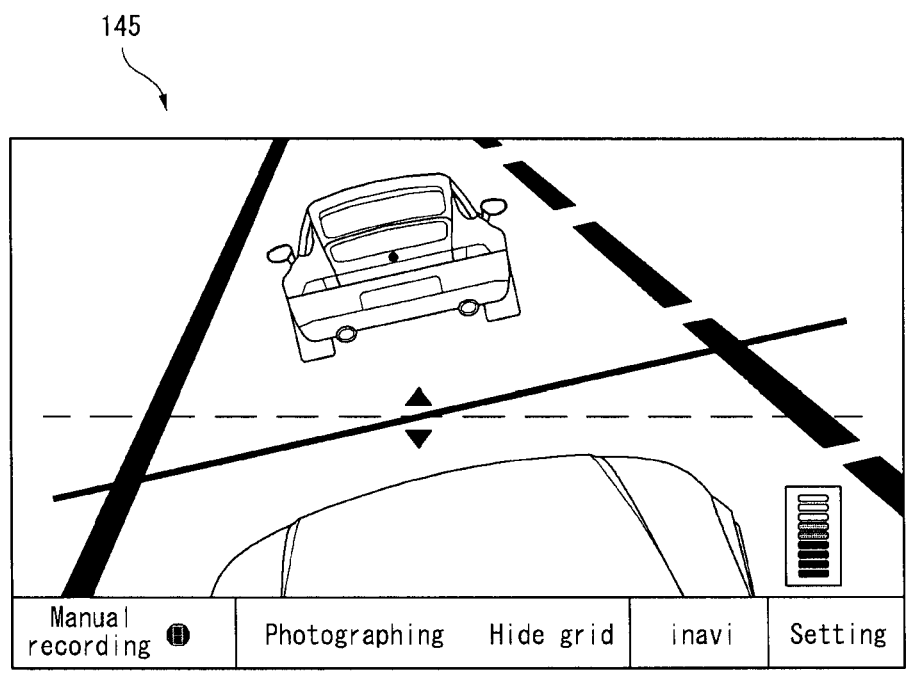

For example, in FIG. 12, when a sensor acquires speed data, acceleration data, and impact data of the vehicle, a size of data acquired by the sensor is displayed in a sensor indicator displayed at the lower end of the right side, and if a size of data displayed in the sensor indicator is equal to or larger than a preset reference, the first reference line and the second reference line are displayed together in the display unit 145.

Further, if speed data, acceleration data, and impact data of the vehicle are equal to or larger than a preset reference, the first reference line and the second reference line may be displayed in the display unit 145, and guidance data including slope data of the first reference line and the second reference line and angle data necessary for making the first reference line and the second reference line in parallel may be guided to the driver.

Figure 13:
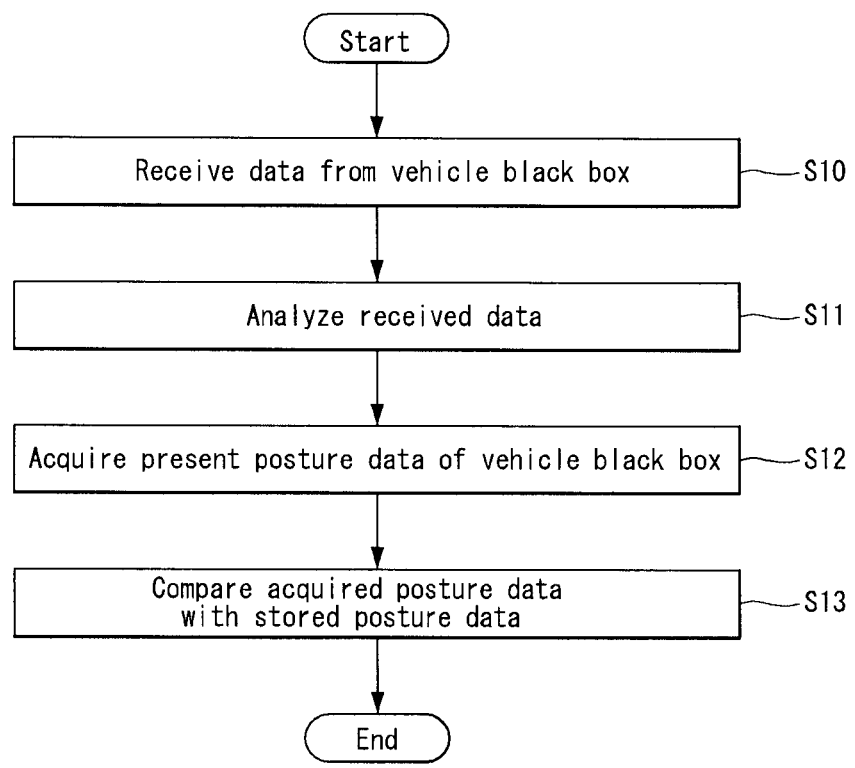
FIGS. 13 to 15 are flowcharts illustrating a method of inducing a black box of a navigation system to a normal position according to an embodiment of the present invention.
Figure 14:
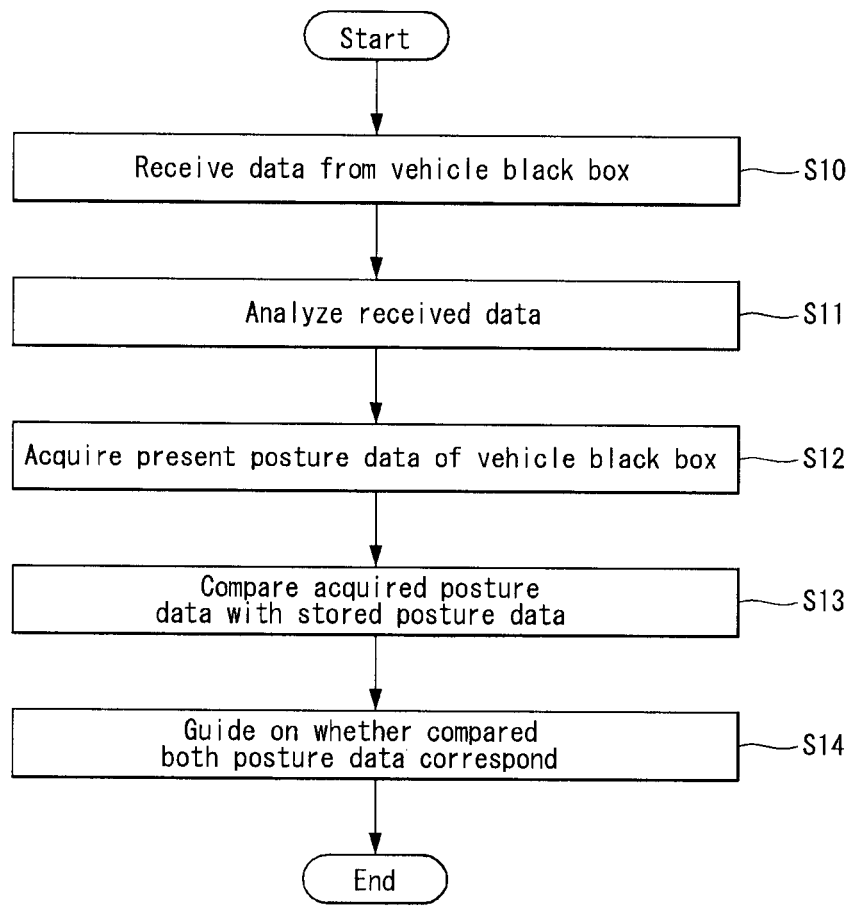
Figure 15:
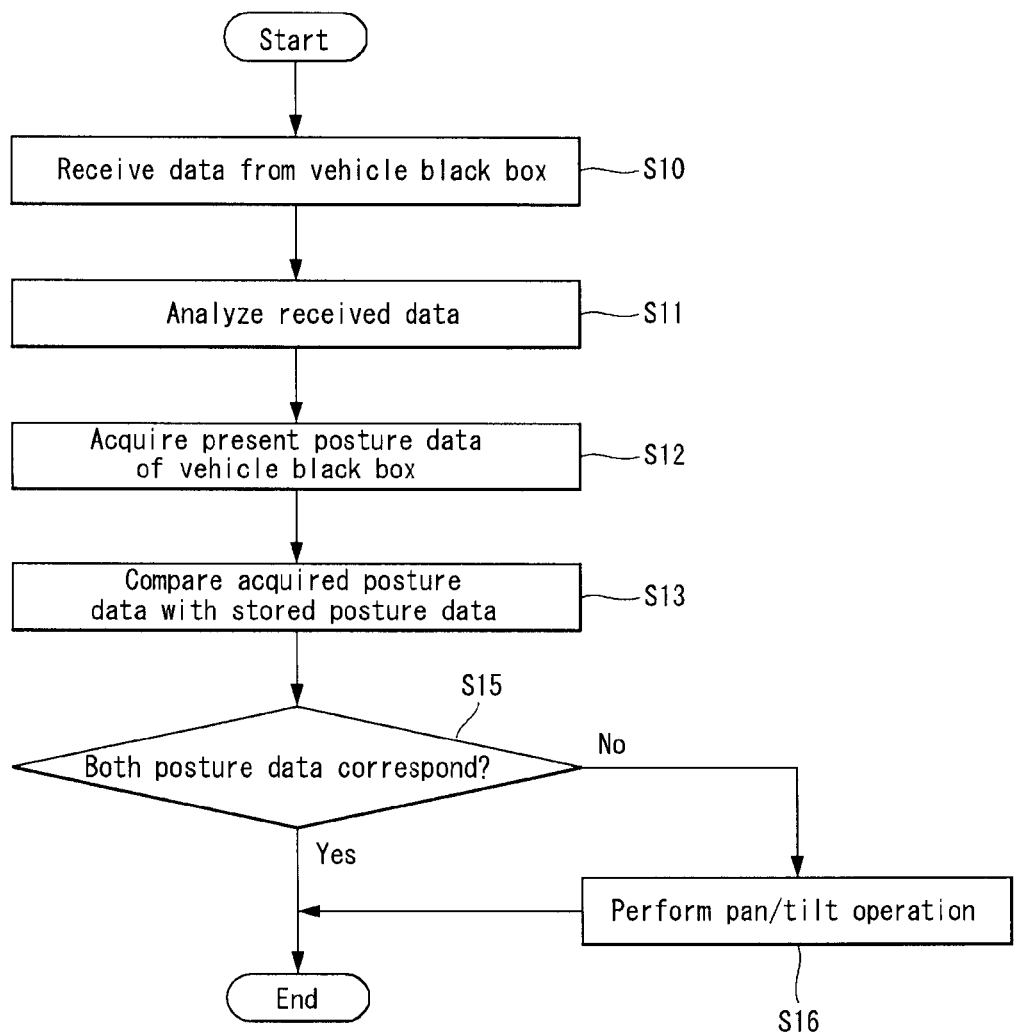

A method of inducing a black box of a navigation system to a normal position will be described with reference to FIGS. 13 to 15.

The vehicle navigation apparatus 100 receives data from the vehicle black box 200 through the first communication unit 110 (S10), the first controller 170 of the vehicle navigation apparatus 100 analyzes the received data (S11), acquires normal posture data of the vehicle black box 200 previously stored at the first storage unit 150 of the vehicle navigation apparatus 100 (S12), the first controller 170 of the vehicle navigation apparatus 100 compares the stored normal posture data and the acquired posture data, whereby enabling the driver to determine whether the vehicle black box 200 is in a normal posture or a normal position.

Further, when the vehicle black box 200 deviates from a normal posture or a normal position, the first controller 170 of the vehicle navigation apparatus 100 compares the acquired posture data of the vehicle navigation apparatus 100 with the stored posture data (S13) and guides data including guidance data on whether the compared both posture data correspond through the output unit 140 of the vehicle navigation apparatus 100 (S14). The data includes character, image, and voice data output through the output unit 140 of the vehicle navigation apparatus 100.

When the vehicle black box 200 deviates from a normal posture or a normal position, the first controller 170 of the vehicle navigation apparatus 100 compares the acquired posture data of the vehicle black box 200 with the stored posture data (S13), and if the acquired both posture data do not correspond, in order to make the normal posture data and the acquired present posture data to correspond, the first controller 170 of the vehicle navigation apparatus 100 or the second controller 270 of the vehicle black box 200 outputs a control signal to the vehicle black box 200 or the camera module 221 so that the vehicle black box 200 or the camera module 221 perform a pan/tilt operation (S16).

Further, the first controller 170 or the second controller 270 compares the acquired posture data of the vehicle black box 200 with the stored posture data (S13), and if both postures correspond, the first controller 170 or the second controller 270 may output data in which both postures correspond to the driver, but may not output data in which both postures correspond to the driver.

Figure 16:
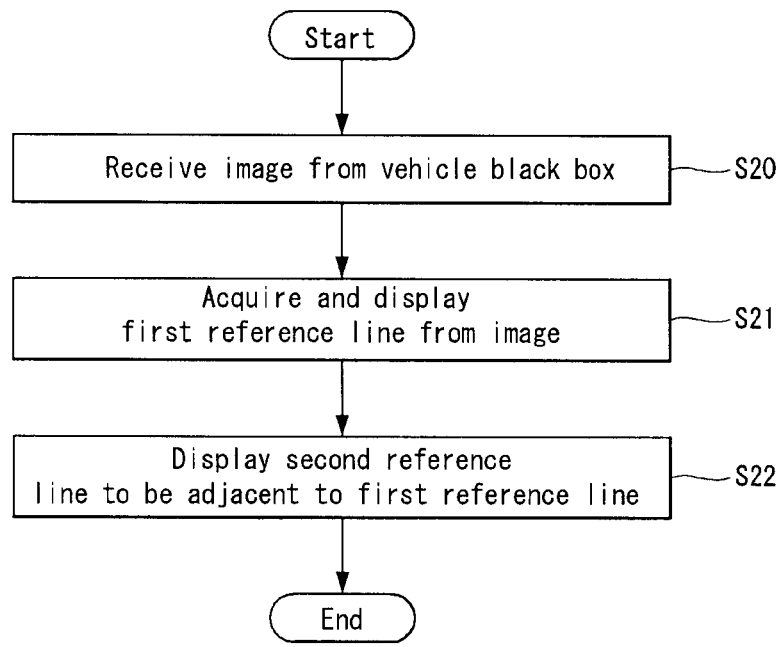
FIGS. 16 to 18 are flowcharts illustrating a method of inducing a black box of a navigation system to a normal position according to another embodiment of the present invention.
Figure 17:
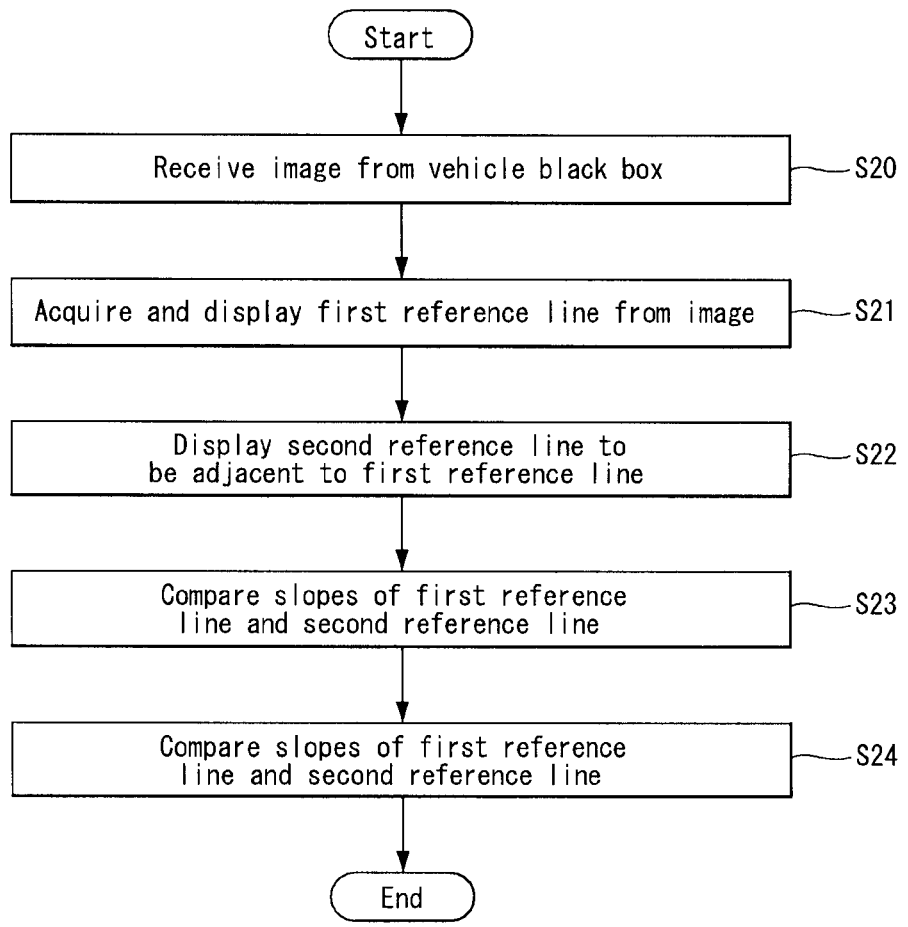
Figure 18:
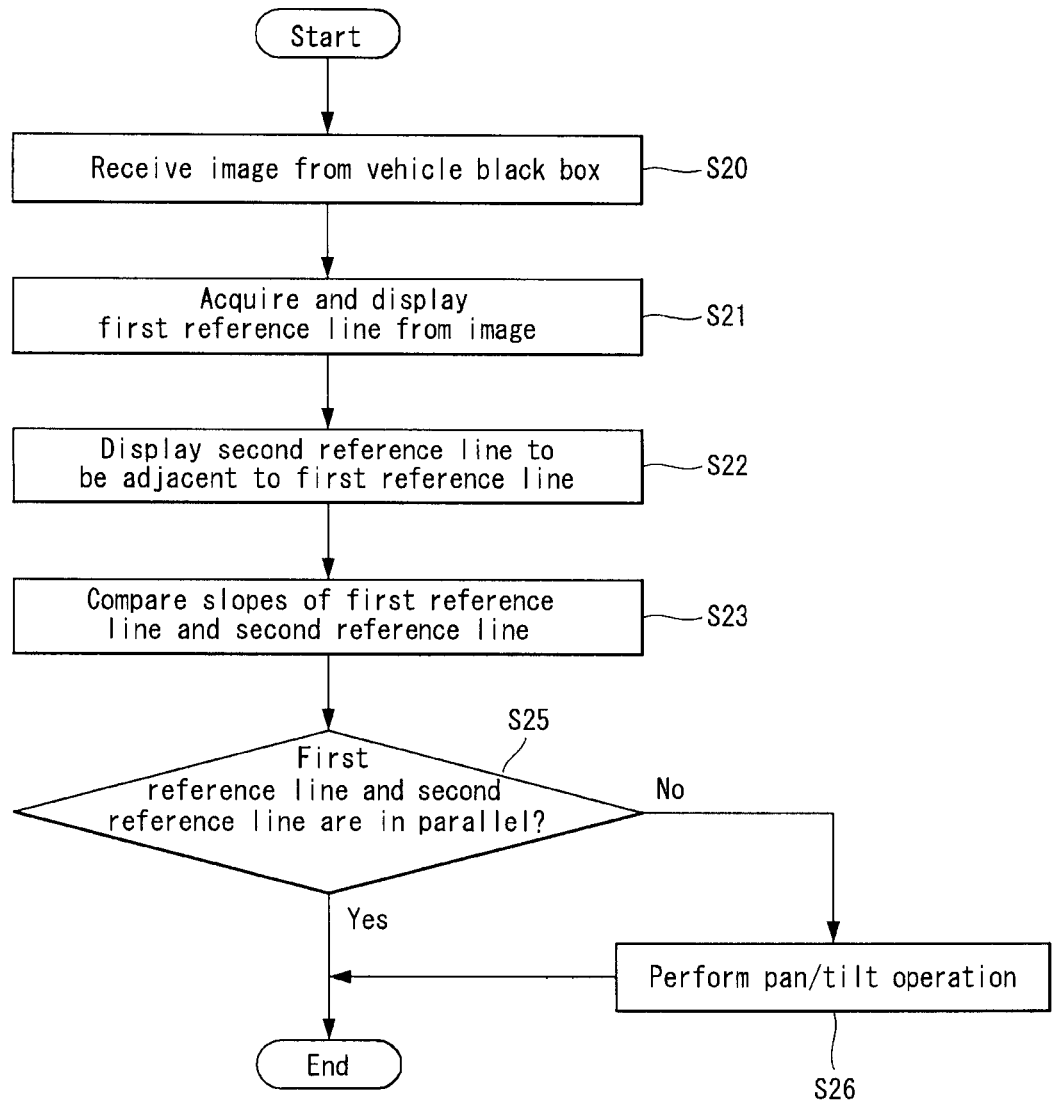

Referring to FIGS. 16 to 18, a method of inducing a black box of a navigation system to a normal position according to another embodiment of the present invention will be described.

The vehicle navigation apparatus 100 receives an image from the vehicle black box 200 through the first communication unit 110 (S20), the first controller 170 of the vehicle navigation apparatus 100 analyzes the received image and acquires and displays a first reference line from a specific object included in the received image (S21), and the first controller 170 controls to display a second reference line for determining an inclined degree of the first reference line to be adjacent to the first reference line (S22).

Further, after comparing slopes of the first reference line and the second reference line, the output unit 140 of the vehicle navigation apparatus 100 outputs the slope data or guidance data for making the first reference line and the second reference line in parallel (S24). The guidance data may be character data and image data displayed in the display module 141 of the vehicle navigation apparatus 100 and may include voice data output through the audio output module 143 of the vehicle navigation apparatus 100, as described above.

After comparing slopes of the first reference line and the second reference line, the first controller 170 of the vehicle navigation apparatus 100 determines whether the first reference line and the second reference line are in parallel (S25), and if the first reference line and the second reference line are inclined instead of parallel, in order to make the normal posture data and the acquired present posture data to correspond, the first controller 170 of the vehicle navigation apparatus 100 or the second controller 270 of the vehicle black box 200 outputs a control signal to the vehicle black box 200 or the camera module 221 so that the vehicle black box 200 or the camera module 221 performs an pan/tilt operation (S26).

Further, if the first reference line and the second reference line are inclined instead of parallel, the first controller 170 of the vehicle navigation apparatus 100 may output guidance data (S24) and may not output the guidance data.

While the present invention has been particularly shown and described with reference to embodiments thereof, it will be understood by those of ordinary skill in the art that various changes in form and details may be made therein without departing from the spirit and scope of the present invention as defined by the following claims.

INDUSTRIAL APPLICABILITY

According to the present invention, a method of inducing a black box of a vehicle navigation apparatus and a navigation system to a normal position that can position a vehicle black box connected and used through wired communication or wireless communication to a normal posture can be provided.

What is claimed is:

1. A vehicle navigation apparatus, comprising:
a memory configured to store normal posture data of a vehicle black box;
a transceiver configured to communicate with the vehicle black box; and
a controller configured to acquire present posture data by analyzing data received from the vehicle black box, determine whether the stored normal posture data corresponds with the acquired present posture data, and control the vehicle black box to have a normal posture according to the stored normal posture data based on the acquired present posture data not matching to the stored normal posture data.

2. The vehicle navigation apparatus of claim 1, further comprising an output driver configured to output data.

3. The vehicle navigation apparatus of claim 2, wherein the controller is configured to output guidance data on whether the stored normal posture data corresponds with the acquired present posture data to the output driver.

4. The vehicle navigation apparatus of claim 3, wherein the controller is configured to output the guidance data according to a preset reference, and
the preset reference comprises at least one of a preset time point, a preset time interval, vehicle engine starting, and event occurrence.

5. The vehicle navigation apparatus of claim 1, wherein the controller is configured to control a pan/tilt drive module provided in the vehicle black box to control the vehicle black box according to the stored normal posture.

6. A vehicle navigation apparatus, comprising:
an output driver configured to output data;
a transceiver configured to communicate with a vehicle black box; and
a controller configured to control a first sensor for determining a slope of the vehicle black box to acquire slope data and control the slope data to output to the output driver,
wherein the controller is further configured to control the vehicle black box to have a normal posture by adjusting the slope of the vehicle black box to be in parallel with a slope of vehicle navigation apparatus.

7. The vehicle navigation apparatus of claim 6, wherein the controller is configured to acquire an angle necessary for enabling the vehicle black box to have a normal posture from the slope data and to output guidance data comprising the angle data.

8. The vehicle navigation apparatus of claim 7, wherein the controller is configured to guide the slope data and/or the angle data according to a preset reference, and the preset reference comprises at least one of a preset time point, a preset time interval, vehicle engine starting, and event occurrence.

9. The vehicle navigation apparatus of claim 6, wherein the controller is configured to control to display a graphic element on the output driver, wherein the graphic element visually reflects the slope data acquired from the first sensor.

10. A vehicle navigation apparatus, comprising:

a display unit;

a transceiver configured to communicate with a vehicle black box; and a controller configured to receive an image from the vehicle black box and to acquire a first reference line from a specific object included in the received image and to display the first reference line on the display unit, and to display a second reference line for acquiring a slope from the first reference line to be adjacent to the first reference line, wherein the controller is further configured to control the vehicle black box to have a normal posture by adjusting the first reference line to be in parallel with the second reference line.

11. The vehicle navigation apparatus of claim 10, wherein the controller is configured to recognize the predetermined specific object using object recognition algorithm for recognizing at least one object included in the received image.

12. The vehicle navigation apparatus of claim 10, wherein the controller is configured to display the first reference line and the second reference line on the received image, or to display the first reference line and the second reference line on a background screen for replacing the received image.

13. The vehicle navigation apparatus of claim 10, wherein the controller is configured to output a signal for controlling a pan/tilt drive module provided in the vehicle black box to the vehicle black box in order to make the first reference line and the second reference line in parallel.

14. The vehicle navigation apparatus of claim 10, wherein the controller is configured to control a second sensor for acquiring speed data and/or outside impact data of the vehicle and to display, if the acquired speed data and/or outside impact data are larger than or equal to a reference, the first reference line and the second reference line on the display unit.

15. The vehicle navigation apparatus of claim 10, wherein the controller is configured to output guidance data comprising an angle necessary for making the first reference line and the second reference line in parallel.

16. The vehicle navigation apparatus of claim 10, wherein the controller is configured to guide the slope data by determining a slope of the first reference line and the second reference line according to a predetermined reference.

17. The vehicle navigation apparatus of claim 16, wherein the predetermined reference comprises at least one of a preset time point, a preset time interval, vehicle engine starting, and event occurrence.

* * * * *